W. A. WOOD.
Harvester.

No. 159,879

Patented Feb. 16, 1875.

Witnesses:
D. R. Cowl
Edmund Masson

Inventor:
Walter A. Wood.
By Atty. A. B. Stoughton.

UNITED STATES PATENT OFFICE.

WALTER A. WOOD, OF HOOSICK FALLS, NEW YORK.

IMPROVEMENT IN HARVESTERS.

Specification forming part of Letters Patent No. 159,879, dated February 16, 1875; application filed January 16, 1875.

*To all whom it may concern:*

Be it known that I, WALTER A. WOOD, of Hoosick Falls, in the county of Rensselaer and State of New York, have invented certain new and useful Improvements in Harvesting-Machines; and I do hereby declare the following to be a full, clear, and exact description of the same, reference being had to the accompanying drawings, making a part of this specification, in which—

Figure 1:
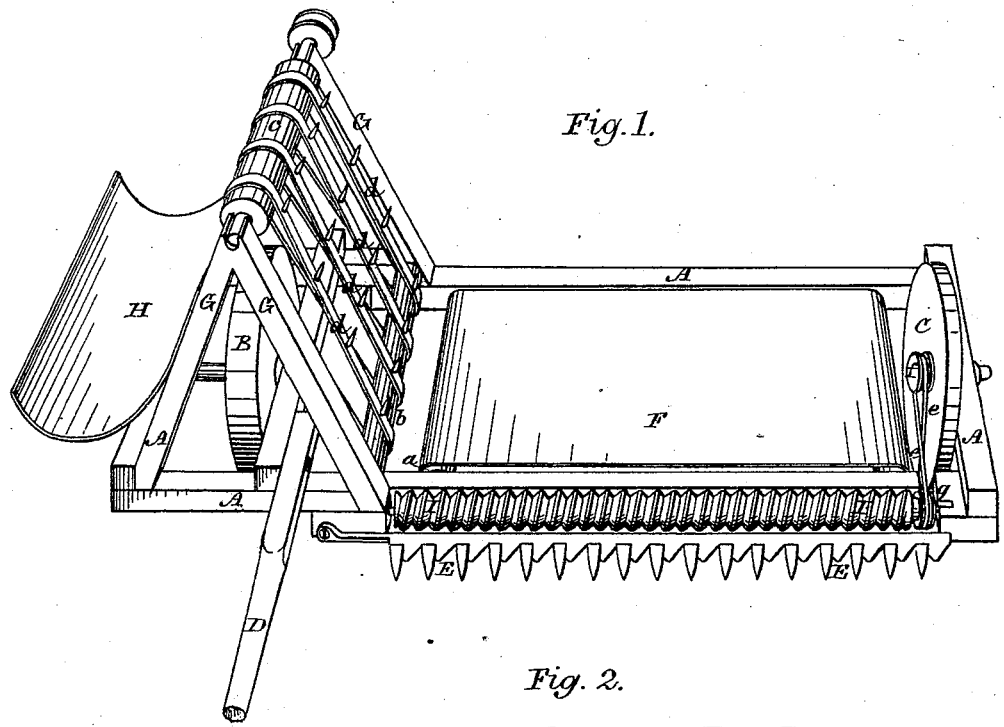
Figure 2:
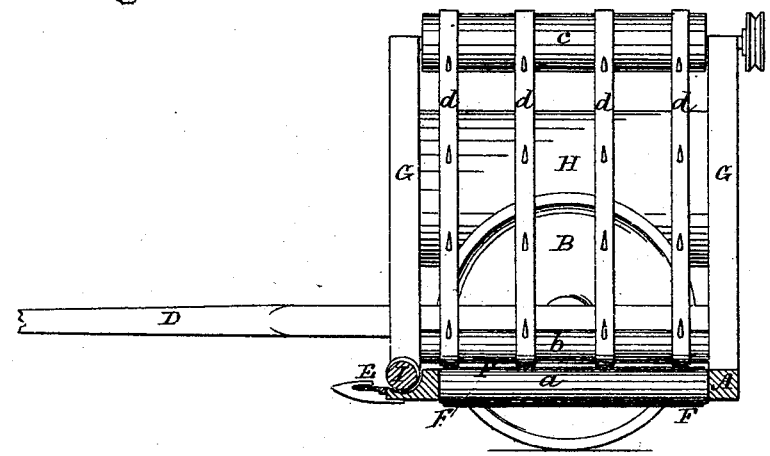

Figure 1 represents, in perspective, so much of a harvesting-machine as will illustrate my invention. Fig. 2 represents a transverse section through the platform or grain-table, and its appliances.

In harvesting-machines having a traveling belt or apron for conveying the cut grain across the platform to elevating-belts, which, in turn, carry it to a binding or receiving table, rollers, both plain and fluted longitudinally, have been used to move the cut grain from the point where it is severed from the stubble onto the traveling belt or apron. This, so far as it goes, is important; but it does not accomplish all that is necessary to be done in this relation. The heads of the cut grain fall fairly upon the moving apron, and, as from their nature, they cling more closely to the apron than the body or butts of the straws do, the heads move instantly with the apron, while the straws may cling or drag before they reach the apron, and this skews the straws and makes them uneven upon the apron.

The object of my invention is to provide means that will not only carry the cut grain back upon the traveling apron, but in doing so aid the grain, before it entirely reaches the apron, in moving in the direction in which the apron travels, and thus lay it in good condition for being carried up and deposited in the receiver or on the binding-table; and my invention consists in the combination of a revolving screw-shaft with an endless carrying-apron, said screw-shaft being placed between the front edge of the apron and the cutting apparatus, and rotated so that the screw-threads will impart two motions to the grain— namely, backward onto the apron, and longitudinally in the direction in which the apron travels.

To enable others skilled in the art to make and use my invention, I will proceed to describe the same with refererence to the drawings.

The main frame A of the machine is supported and carried upon the inside and outside wheels B C, of which the former is the main driving-wheel. The pole by which the machine is drawn and guided is shown at D, and the cutting apparatus at E. At that part of the main or platform frame, where the grain-table is usually placed, and behind the cutting apparatus, is placed an endless apron, F, which passes around rollers at each end of said platform or table frame, one of which rollers is driven by any suitable mechanism connected to or with the main drive-wheel, so as to move the carrying-surface of the apron toward the stubble side or end of the machine. At or near the inner roller $a$ of the apron there is another roller, $b$, around which and around a driven roller, $c$, mounted upon the supports G, pass toothed belts $d$, which take the straw or cut grain from the endless apron, and carry it up and over into the receiver or binder's table H, where it may be bound up in bundles, or whence it may be delivered in gavels to be afterward bound. In front of the carrying-apron F, and in rear of the cutting apparatus E, with its long axis parallel to both, is placed, in suitable bearings, the screw-shaft I, which may be driven from the outer wheel C by means of an endless belt or band, $e$, passing around the pulleys $f$ $g$, one on the wheel C, or its shaft or journal, and the other on the screw-shaft I, which latter rotates toward the apron F, while the pitch of the screw-threads is such as to move the straws, or that portion of the straws resting upon said screw-threads in the same direction in which the apron moves, thus keeping them straight and compact. The screw-shaft or the screw-threads, as better seen in Fig. 2, revolve in a plain a little above the surface of the finger-bar, so that the straw, resting partially upon the screw-shaft and partially upon the apron, will not touch or cling to any immovable surface, but be advanced by both the screw-shaft and the apron in the direction in which it is to be carried, and at the same time that it is thus moved across the platform to the elevating-belts, it is carried back and evenly laid upon the apron.

As stated above, I have only shown so much of a harvesting-machine as will illustrate my particular invention. Any other of the well-known appliances of reaping-machines may be used with this gathering and delivering mechanism, and I propose to use any or all such as may be useful in carrying out my invention. I have mentioned an endless apron only as the appliance by which the grain is moved across the platform to the elevating mechanism.

Instead of an apron, endless belts or other moving platform or mechanism may be used to carry the grain to the elevating mechanism. Such endless belts would be only an apron divided into strips, and, mechanically, the same thing.

Having thus fully described my invention, what I claim, is—

In combination with the carrying belts or apron F, the screw-shaft I, for the double purpose of moving the cut grain backward onto the apron, and laterally in the direction in which the apron travels, substantially as described and represented.

WALTER A. WOOD.

Witnesses:
J. TYLER POWELL,
A. T. SKINNER.